United States Patent Office 3,340,147
Patented Sept. 5, 1967

3,340,147
AMIDES OF N-ACYLATED CYSTEINES
Tellis Alexander Martin and Aaron Leonard Sheffner, Evansville, Ind., assignors to Mead Johnson & Company, Evansville, Ind., a corporation of Indiana
No Drawing. Filed June 28, 1965, Ser. No. 467,674
8 Claims. (Cl. 167—55)

This invention is concerned with improved mucolytic agents and with improvements in mucolytic processes using these agents. The invention concerns itself particularly with the novel class of chemical compounds comprising amides of N-acylated cysteine compounds. These substances have the following formula:

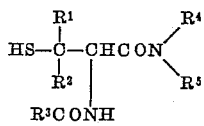

In this formula $R^1$ and $R^2$ are hydrogen atoms or lower alkyl groups having up to about 4 carbon atoms. When $R^1$ and $R^2$ are each hydrogen atoms, the products are derivatives of the amino acid cysteine. When $R^1$ and $R^2$ are methyl groups, the products are derivatives of the amino acid penicillamine.

$R^3$ represents a hydrogen atom or the organic residue of the N-acyl group, in which event it is either an alkyl group, an aryl group, or an aralkyl group having up to 9 carbon atoms.

$R^4$ and $R^5$ are hydrogen atoms in the case of the simple amides which constitute preferred embodiments of the present invention. In other embodiments they represent the organic residues of N-substituted amides. More specifically, $R^4$ is either a hydrogen atom, an alkyl, alkenyl, cycloalkyl, or cycloalkenyl group of up to 5 carbon atoms. To name a few representative residues, the following may be mentioned: methyl, ethyl, propyl, allyl, pentyl, butyl, t-butyl, cyclopentyl, cyclopentenyl, etc. $R^5$ is either a hydrogen atom or a lower alkyl group of up to 4 carbon atoms. $R^4$ and $R^5$ may be substituted by from 1 to 2 hydroxyl groups. Alternatively, $R^4$ and $R^5$ may be connected to form together with the nitrogen atom a heterocyclic group such as piperidino, pyrrolidino, N'-$R^5$-piperazino (in which $R^5$ has the aforesaid meaning), morpholino, thiamorpholino, hexamethylenimino, etc.

These substances are prepared from the amino acid cysteine, an ester thereof, or a substituted analog where $R^1$ and $R^2$ have the meaning indicated above. The mercapto group thereof is preferably protected by a substituent which is easily removed in the latter process stages such as benzyl, benzhydryl, or triphenylmethyl. The steps involved in introducing the N-acyl group ($R^3CO$) and the amido group

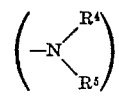

may be conducted in various sequences and fashions. For instance, S-benzyl cysteine methyl ester or other ester may be treated with ammonia or a primary or secondary amine to form the corresponding amide which is then acylated and the protecting S-benzyl group removed, or the latter two steps may be interchanged. The p-nitrophenyl esters have been found to be particularly well suited for this purpose.

Alternatively, the corresponding bis-N-acylcystine diamide may be reduced to the desired N-acylcysteine amide by one of the customary methods such as zinc-hydrochloric acid or other chemical, catalytic, or metal hydride methods. Finally, direct reaction of the N-acyl mercaptoamino acid with the amide-forming amine in the presence of dicyclohexyl-carbodiimide may be employed.

These methods are illustrated in the following reaction schemes.

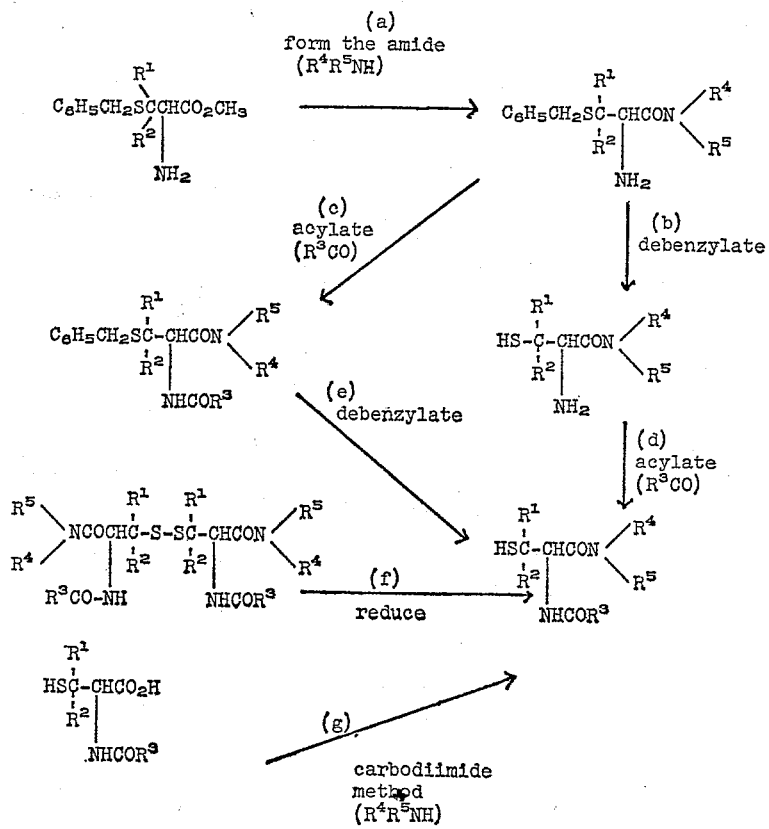

The products of the present invention have utility as mucolytic agents and as such have the ability to liquefy mucoproteins, animal mucus, etc. on contact therewith. They represent an improvement over the corresponding N-acylcysteines and the salts thereof whose utility as mucolytic agents is disclosed and claimed in U.S. Patent 3,091,569 dated May 28, 1963 of Aaron Leonard Sheffner. The amides of the N-acylcysteines of the present invention have the advantage of having greater mucolytic activity, increased stability to oxidation in dilute solution, greater water solubility at neutral and acidic pH values, and improved compatibility in pharmaceutical dosage forms with a variety of other medicinal ingredients.

An experiment comparing the capacity of N-acetyl-L-cysteine of the above patent with L-2-acetamido-3-mercapto-N-methylpropionamide, L-2-acetamido-3-mercaptopropionamide, and L-2-propionamido-3-mercaptopropionamide to reduce the viscosity of a mucoprotein solution is illustrative of the increased activity of the N-acyl amides of this invention. To prepare the mucoprotein for these tests, commercial hog mucin was suspended in 500 ml. of 0.05 N sodium hydroxide and 12.50 ml. of 10% 1.0 N perchloric acid was added thereto with mixing which was continued for 1 hr. This resulted in precipitation of the proteins, other than the mucoprotein, and nucleic acids. Precipitated material was removed by centrifugation at 3300×g and discarded. The supernatant fluid was adjusted to pH 7 with 10 N potassium hydroxide and precipitated potassium chlorate was removed by centrifugation. Mucoprotein was then precipitated by treatment of the supernatant fluid with 60 g. of ammonium sulfate for each 100 ml. thereof, the precipitated protein separated, dialyzed against distilled water, and dried by lyophilization.

In each test the reaction mixtures consisted of the mucoprotein, 1.5%; sodium chloride, 0.9%; test compound, 0.05 M in a total volume of 1 ml. The solutions were adjusted to pH 8.0 and held at 37° C. for the period of time specified.

The results are shown in Table 1. Substantially greater activity is demonstrated by the N-acylamides of this invention at each time period.

TABLE 1.—COMPARISON OF THE RATE AND EXTENT OF REDUCTION OF VISCOSITY OF MUCOPROTEIN SOLUTION

| Compound | Percent Decrease in Viscosity | | |
| --- | --- | --- | --- |
|  | 3 min. | 30 min. | 60 min. |
| N-acetyl-L-cysteine | 9 | 16 | 21 |
| L-2-acetamido-3-mercaptoproprionamide | 27 | 33 | 34 |
| L-2-acetamido-3-mercapto-N-methylpropionamide | 20 | 27 | 28 |
| L-2-propionamido-3-mercaptopropionamide | 20 | 26 | 29 |

The enhanced oxidative stability of L-2-acetamido-3-mercaptopropionamide was demonstrated as follows. Solutions of cysteine, N-acetyl-L-cysteine, and L-2-acetamido-3-mercaptopropionamide having concentrations of $0.4\mu$ mole per ml. and containing $10^{-7}$ M/ml. copper sulfate as oxidation catalyst were prepared in pH 8 0.1 M tris buffer. Oxygen was bubbled through similar aliquots thereof for specified periods of time. The residual thiol concentration after oxygen treatment was then determined by the p-chloromercuribenzoate method. The results shown in Table 2 were obtained. They illustrate that oxidative losses of L-2-acetamido-3-mercaptopropionamide are minor in comparison to the extensive loss of N-acetyl-L-cysteine and total loss of cysteine from the comparison solutions.

TABLE 2.—COMPARISON OF OXIDATIVE STABILITY

| Compound | Percent Reduction in Thiol Concentration | | |
| --- | --- | --- | --- |
|  | 15 min. | 30 min. | 1 hr. |
| Cysteine | 65 | 100 | 100 |
| N-acetyl-L cysteine | 18 | 52 | 93 |
| L-2-acetamido-3-mercaptopropionamide | 6 | 7 | 12 |

Additional preferred embodiments of the present invention are those substances in which $R^1$, $R^2$, and $R^5$ are hydrogen, and in which $R^3$ and $R^4$ are hydrogen or contain at most 2 carbon atoms. These substances are favored for their high water solubilities at neutral and slightly acidic pH values, e.g., from about pH 4.0 to 7.0.

The above properties particularly suit the compounds of the present invention for various pharmaceutical and commercial uses, for instance as nasal decongestants, for mucolytic use in respiratory conditions by inhalation of a nebulized solution thereof, for other mucolytic uses by direct contact of solutions thereof with mucus including the laboratory examination of sputa.

The improved pharmaceutical compatibility of L-2-acetamido-3-mercaptopropionamide relative to N-acetyl-L-cysteine is illustrated in an experiment in which a formulation for use in barium enema radiopaque therapy was prepared. Roentgenoscopic examination is the only satisfactory method for the objective study of the entire colon. For this purpose a radiopaque solution, customarily a 7% suspension of barium sulfate, is introduced into the colon. It has been common in the past to incorporate various other ingredients into such radiopaque enema solutions such as acacia or tragacanth to aid in the homogenization of the barium sulfate suspension, and tannic acid to serve as an astringent and to inhibit the secretion of mucus. The latter has recently been the subject of criticism in some circles as a hazardous ingredient. The use of the present mucolytic agents in such formulations to liquefy mucus accumulations is, therefore, suggested.

A comparison of L-2-acetamido-3-mercaptopropionamide with N-acetyl-L-cysteine in this use was conducted as follows. Solutions of 3% purified hog gastric mucin were prepared as before and adjusted to pH 8.2. Aliquots of mucoprotein solution were then mixed with the barium sulfate suspension alone and containing N-acetyl-L-cysteine or L-2-acetamido-3-mercaptopropionamide, and the viscosity measured in a micro-Ostwald viscometer after incubation at 37° C. for various time periods. The results are shown in Table 3.

TABLE 3.—MUCOLYTIC ACTIVITY IN THE PRESENCE OF BARIUM SULFATE

| Test Solution | Percent Change in Viscosity | |
| --- | --- | --- |
|  | 5 min. | 20 min. |
| Control, (BaSO$_4$, 71 mg./ml., pH 8.2) | +7 | −3 |
| N-acetyl-L-cysteine 0.018 M, plus BaSO$_4$, 71 mg./ml., pH 7.7 | +4 | −4 |
| L-2-acetamido-3-mercaptopropionamide, 0.018 M, plus BaSO$_4$, 71 mg./ml., pH 7.7 | −13 | −20 |

It is apparent that the N-acetyl-L-cysteine was ineffective when mixed with the barium sulfate suspension. In addition, the N-acetyl-L-cysteine was observed to bring about coagulation of the colloidal barium sulfate suspension. Coagulation of the colloid was not observed in the case of L-2-acetamido-3-mercaptopropionamide, and it is apparent that it possessed substantial capacity to reduce the viscosity of the mucoprotein solution in the presence of the colloidal barium sulfate suspension.

The mucolytic properties of the compounds of the present invention are equal for all optical forms and stereoisomers thereof. It will be noted that each of the compounds of the present invention contains at least one asymmetric carbon atom, and in instances determined by the nature of the $R^1$, $R^2$, $R^3$, $R^4$, and $R^5$ substituents, more than one asymmetric carbon atom. All stereoisomeric variations are intended to be included within the present invention.

EXAMPLE 1

(a) *L-2 - amino - 3 - benzylthiopropionamide.*—A saturated methanol solution of ammonia having the volume of approximately 2.1 l. is prepared and cooled to 10–50° C. and 133 g. (0.51 mole) of S-benzyl-L-cysteine methyl ester hydrochloride is dissolved therein. Ammonia gas is introduced into the cold solution at a moderate rate for an additional hour. The flask is then tightly stoppered and kept at room temperature for three days. It is then cooled, the stopper removed, and the solution concentrated by distillation at reduced pressure until a precipitate forms. Dry ether, 500 ml., is added to the slurry and the precipitate collected, yielding 54 g. (43%) of a white solid which is recrystallized from ethanol to provide the analytically pure amide hydrochloride salt, M.P. 210–212° C., (dec.); $[\alpha]_D^{25} = +24.3°$ (c. 0.5, water).

*Analysis.*—Calcd. for $C_{10}H_{14}N_2OS \cdot HCl$: N, 11.36; S, 12.99; Cl, 14.37. Found: N, 11.42; S, 12.93; Cl, 14.94.

A further quantity, 62 g. (58%) of L-2-amino-3-benzylthiopropionamide was isolated as the free base by concentration of the mother liquor and dilution with dry ether. It was purified by recrystallization, first from water and then from ethyl acetate, M.P. 75.5–77.5° C.

*Analysis.*—Calcd. for $C_{10}H_{14}N_2OS$: C, 57.11; H, 6.71; N, 13.32; S, 15.25. Found: C, 57.03; H, 6.70; N, 13.32; S, 14.85.

(b) *L-2-amino-3-mercaptopropionamide hydrochloride.*—L-2-amino-3-benzylthiopropionamide, 38 g. (0.18 mole) is dissolved in 550 ml. of liquid ammonia and small pieces of sodium are added thereto until a blue coloration persists for a period of 10 min. Excess sodium amide is then decomposed by the addition of ammonium chloride in successive small portions and the solvent ammonia permitted to evaporate. The residual solid is dissolved in 200 ml. of water, the solution acidified with 130 ml. of 6 N hydrochloric acid and extracted with two 250 ml. portions of ether. The aqueous layer is warmed to expel entrained ether, and a solution of 68 g. of mercuric chloride in 60 ml. of 6 N hydrochloric acid and 100 ml. of water is added. The precipitate which forms is then allowed to stand at room temperature for 3 hrs. while the solution is kept under an atmosphere of dry nitrogen gas. The supernatant liquid is decanted and the precipitated material is triturated with water, collected on a filter, and washed. It is then suspended in 600 ml. of 3 N hydrochloric acid and treated with hydrogen sulfide gas for a period of 3 hrs., during which time mercuric sulfide precipitated and was removed by filtration. The filtrate was concentrated at 40–50° C. to provide a cream-colored solid which was dried and recrystallized from 165 ml. of 90% methanol; yield 15 g. (53%) of white solid, M.P. 186.5–187.5° C., dec.

*Analysis.*—Calcd. for $C_3H_8N_2OS \cdot HCl$: N, 17.87; SH, 21.1. Found: N, 17.94; SH, 20.9.

(c) *L-2-acetamido-3-benzylthiopropionamide.*—A suspension of 10.5 g. (0.05 mole) of L-2-amino-3-benzylthiopropionamide in 100 ml. of ethyl acetate is treated with 7 g. (0.069 mole) of acetic anhydride. The reaction temperature rises exothermically to about 40° C. A solution forms after which precipitation of the product quickly follows. The mixture is then heated to 65° C. for 10 min., cooled, and the product collected. It is washed on the filter with ethyl acetate and dried, yielding 10.5 g. (83%) of product. It is recrystallized from 85% aqueous ethanol, yielding the purified product, M.P. 150–151.5° C.; $[\alpha]_D^{25} = -30.98°$ (c. 2, ethanol).

*Analysis.*—Calcd. for $C_{12}H_{16}N_2O_2S$: C, 57.12; H, 6.39; N, 11.10. Found: C, 57.24; H, 6.48; N, 10.90.

(d) *L-2-acetamido-3-mercaptopropionamide by acetylation.*—A suspension of 11 g. (0.07 mole) of L-2-amino-3-mercaptopropionamide hydrochloride in 80 ml. of tetrahydrofuran and 17.4 ml. of water is treated with 10.9 g. (0.08 mole) of sodium acetate trihydrate. The reaction mixture is cooled to 0–5° C. and 6.7 ml. (0.07 mole) of acetic anhydride is added during a 20 min. period. The mixture is stirred for 16 hrs. at room temperature and then acidified with 3 ml. of 6 N hydrochloric acid contained in 200 ml. of tetrahydrofuran. Sodium chloride is separated by filtration and the filtrate concentrated to give the product as a white solid which is recrystallized from 60 ml. of ethanol, yield 7 g. (61%) of white solid, M.P. 147–149° C., $[\alpha]_D^{25} = -7.92°$ (c. 5, water).

*Analysis.*—Calcd. for $C_5H_{10}N_2O_2S$: C, 37.02; H, 6.21; N, 17.27. Found: C, 36.94; H, 6.24; N, 16.99.

(e) *L-2-acetamido-3-mercaptopropionamide by debenzylation.*—To a container containing 500 ml. of liquid ammonia there is added simultaneously in portions 25.2 g. (0.1 mole) of L-2-acetamido-3-benzylthiopropionamide and metallic sodium (about 5.5 g.) previously cut into small pieces. After the blue coloration of the solution persists for 10 min., signifying the presence of an excess of sodium amide, the solvent ammonia is evaporated by passing a stream of dry nitrogen gas over the solution. The solid residue is dried in vacuo, treated with 40 ml. of ice water, and acidified to pH 4–5 with concentrated hydrochloric acid. The product is collected on a filter and dried; yield, 8.1 g. (50%). This material was recrystallized from 90% aqueous ethanol to give the purified product, M.P. 148–150° C.; $[\alpha]_D^{25} = -12.28°$ (c. 5, water).

EXAMPLE 2

*L-2-acetamido - 3-mercapto - N-cyclopentylpropionamide.*—A solution of 8.1 g. (0.05 mole) of N-acetyl-L-cysteine in 90 ml. of tetrahydrofuran is prepared and kept under an atmosphere of nitrogen. The solution is cooled to 10° C. and 4.25 g. (0.05 mole) of cyclopentylamine is added thereto. N,N'-dicyclohexylcarbodiimide, 10.5 g. (0.051 mole), is then mixed with the reaction mixture, whereupon the temperature increases to 25° C. and external cooling is employed to keep the temperature from rising further. After the initial reaction has subsided the reaction mixture is stirred over night at room temperature. By-product N,N'-dicyclohexylurea is removed by filtration, and the filtrate concentrated to yield the desired product.

EXAMPLE 3

(a) *L-2-amino-3-benzylthio-N-methylpropionamide.*—The procedure of Example 1 (a) is repeated with 13.1 g. (0.05 mole) of S-benzyl-L-cysteine methyl ester hydrochloride substituting 200 ml. of methanolic methylamine for the methanolic ammonia. The desired intermediate N-methylpropionamide derivative is recovered in the same fashion as described in that example.

(b) *L-2-acetamido - 3-benzylthio-N-methylpropionamide.*—The product from the preceding step (Example 3 (a)) is mixed with a solution of 4 g. of sodium acetate in 25 ml. of water and treated with 10 ml. of acetic anhydride. The reaction temperature increases to 60° C., and the product separates as a white solid. It is collected on a filter, washed, and dried; yield 10.0 g. (75%). It is recrystallized first from ethanol and then from ethyl acetate to provide the purified product, M.P. 155.5–156.5° C., $[\alpha]_D^{25} = -19.69°$ (c. 2, ethanol).

*Analysis.*—Calcd. for $C_{13}H_{18}N_2O_2S$: C, 58.62; H, 6.81; N, 10.52. Found: C, 58.66; H, 6.97; N, 10.37.

(c) *L-3-3'-dithio-bis-[2-acetamido - N-methylpropionamide].*—The product of Example 3 (b) is allowed to react with sodium and liquid ammonia according to the procedure described in Example 1 (b). The product isolated is the dithio-bis- compound named above rather than the simple cysteine derivative which results from the debenzylation, yield, 2.0 g. (60%). The product is recrystallized from methanol to give the purified substance, M.P. 263.5–264.5° C. (dec.), $[\alpha]_D^{25} = -76.75°$ (c. 1, water).

*Analysis.*—Calcd. for $C_{12}H_{22}N_4O_4S_2$: C, 41.12; H, 6.33. Found: C, 41.14; H, 6.40.

This product can also be prepared from L-cystine dimethyl ester dihydrochloride by treatment with methanolic methylamine followed by acetylation as described in Example 4.

(d) *L-2-acetamido - 3-mercapto - N-methylpropionamide.*—A mixture of 8 g. of L-3,3'-dithio-bis-[2-acetamido-N-methylpropionamide] and 5 g. of zinc dust is warmed with stirring at 40–50° C. with 68 ml. of 0.7 N hydrochloric acid for 2 hrs. Unreacted zinc is then removed by filtration and the filtrate is concentrated to yield 2.8 g. (35%) of the desired product. This material is twice recrystallized from ethanol while being kept under an atmosphere of dry nitrogen. The purified product is obtained as a white solid, M.P., 196–199° C., $[\alpha]_D^{25} = -27.9°$ (c. 1, water).

*Analysis.*—Calcd. for $C_6H_{12}N_2O_2S$: C, 40.89; H, 6.87; N, 15.77; SH, 18.76. Found: C, 41.06; H, 6.81; N, 15.77; SH, 19.3.

EXAMPLE 4

*L-3,3'-dithio - bis - [2 - acetamidopropionamide.*—L-cystine dimethyl ester dihydrochloride, 6 g. (0.018 mole), is added to 160 ml. of methanol which had been saturated with ammonia at 10–15° C. Ammonia gas is passed through the reaction solution for an additional ½ hr., and the mixture then tightly stoppered and kept at room temperature for two days. It is then concentrated by distillation of the bulk of the solvent and evaporation of excess ammonia. The intermediate L-cystine diamide is obtained as a yellow solid which is acetylated without further purification by treatment with 2.9 g. of sodium acetate dissolved in 20 ml. of water and 3.5 ml. of acetic anhydride at 50° C. The solution is concentrated to dryness and the residue triturated with methanol, the solid collected, washed with methanol, and dried; yield 4 g. (70%). It is recrystallized from water to give the product as a white solid, M.P. 240.5–241.5° C. (dec.); $[\alpha]_D^{25} = -124.49°$ (c. 1, H₂O).

*Analysis.*—Calcd. for $C_{10}H_{18}N_4O_4S_2$: C, 37.25; H, 5.63; N, 17.38. Found: C, 37.55; H, 5.90; N, 17.68.

This product is then converted to L-2-acetamido-3-mercaptopropionamide by reduction with zinc and hydrochloric acid as described in Example 3 (d).

EXAMPLE 5

*D,L-2-hexanoamido-3 - mercapto - 3 - methyl - N,N-dimethylbutyramide.*—N - hexanoylisopropylidene - D,L-penicillamine is prepared from 2,2,5,5-tetramethyl-4-carboxy-D,L-thiazolidine and hexanoyl chloride in pyridine. A solution of 0.05 mole of this material and 6.95 ml. of triethylamine in 100 ml. of methylene chloride is treated with 5.4 g. (0.05 mole) of ethyl chloroformate at −8° C. A pre-cooled solution of 0.05 mole of dimethylamine in 40 ml. of methylene chloride is then introduced. The mixture is stirred for about 20 min. at −5° C. and then for approximately 2 hrs. at room temperature. It is then diluted to about 1 l. with methylene chloride and washed successively with 100 ml. portions of 5% aqueous hydrochloric acid, 5% aqueous sodium bicarbonate, and water. The solvent is then distilled at reduced pressure from the methylene chloride layer, yielding a residue consisting principally of 3-hexanoyl-4-dimethylcarbamoyl-2,2,5,5-tetramethylthiazolidine. A portion of this material weighing 2.0 to 2.5 g. is allowed to stand overnight with a solution of 10% mercuric chloride in 20 ml. of methanol. The mixture is then warmed for 45 min. on a steam bath and diluted with 100 ml. of water. The precipitate which forms is collected and treated in aqueous suspension with hydrogen sulfide. The by-product mercuric sulfide is removed by filtration and the filtrate evaporated to dryness in vacuo, giving the desired product.

EXAMPLE 6

*L-2-acetamido - 3 - mercapto-N - allylpropionamide.*—The procedure of Example 2 is repeated substituting allylamine for the cyclopentylamine specified in that example. Execution of the indicated operations then provides this desired product.

EXAMPLE 7

(a) *L-2 - benzamido-3-benzylthiopropionamide.*—L-2-amino-3-benzylthiopropionamide, 0.20 mole is prepared as described in Example 1(a), and mixed with a solution of 130 ml. of water containing 16.4 g. (0.20 mole) of sodium acetate. There is then added to this mixture 31.2 g. (0.22 mole) of benzoyl chloride. An exothermic reaction occurs. A viscous slurry forms and an additional 100 ml. of water is added to make the mixture more manageable. The above named material is then collected by filtration of the slurry, washed with water, and dried in vacuo. This material is twice recrystallized from ethanol to yield the purified intermediate; M.P. 164–165° C. (dec.); $[\alpha]_D^{25} = -73.40°$ (c. 1, methanol).

*Analysis.*—Calcd. for $C_{17}H_{18}N_2O_2S$: C, 64.94; H, 5.78; N, 8.91; S, 10.20. Found: C, 64.89; H, 5.85; N, 8.70; S, 10.21.

(b) *L-2-benzamido - 3 - mercaptopropionamide.*—The product of Example 7 (a) is debenzylated according to the method of Example 1 (e), yielding the desired product.

EXAMPLE 8

(a) *L-3,3'-dithio - bis - (2 - propionamidopropionamide).*—L-cystine dimethyl ester dihydrochloride, 34.1 g. (0.10 mole), is converted to the diamide by treatment with 400 ml. of saturated anhydrous methanolic ammonia for 5 days at room temperature. The solution is then concentrated by distillation of the solvent and excess ammonia at reduced pressure. The residue is suspended in a solution of 16.4 g. (0.20 mole) of sodium acetate in 50 ml. of water, and treated with 40 ml. (0.31 mole) of propionic anhydride. An exothermic reaction occurs. The solution is then treated with decolorizing carbon, filtered, concentrated to dryness, and the residual gum crystallized by trituration with ethyl acetate and water. The crude product is twice recrystallized from ethanol; M.P. 192–193.5° C., $[\alpha]_D^{25} = -107.29°$ (c. 1, C₂H₅OH).

*Analysis.*—Calcd. for $C_{12}H_{22}N_4O_4S_2$: C, 41.12; H, 6.34; N, 15.99; S, 18.30. Found: C, 40.78; H, 6.29; N, 15.71; S, 18.01.

(b) *L-2 - propionamido - 3 - mercaptopropionamide.*—This product is prepared from the substance resulting from Example 8 (a), by the procedure of Example 3 (d). It is purified by recrystallization from ethanol-ethyl acetate to yield the purified product as a white crystalline solid; M.P. 160–162.5° C. (dec.); $[\alpha]_D^{25} = -14.65°$ (c. 1, CH₃OH).

*Analysis.*—Calcd. for $C_6H_{12}N_2O_2S$: C, 40.89; H, 6.86; N, 15.90; S, 18.20. Found: C, 41.10; H, 6.96; N, 15.78; S, 18.29.

EXAMPLE 9

*Liquefaction of Human Sputa.*—Sputum samples were obtained from two hospitalized patients having different pulmonary pathologies and used in the evaluation of the liquefying capacity of L-2-acetamido-3-mercaptopropionamide thereon. The specimens were homogenized in a Potter-Elvehjem type of homogenizer using a Teflon pestle. Test solutions having the compositions shown in the following table and pH 7.0 were prepared, and 0.1 ml. portions mixed with 0.9 ml. of the homogenized sputum, which exhibited pH 7.4. The mixtures were kept at 37° C. for the various periods of time shown in the table and then the relative viscosities thereof measured with an Ostwald semi-microviscometer having a bulb with 1 ml. capacity. A viscometer was selected having a flow time of 10–15 sec. for distilled water. The viscosity of the homogenized sputum was found to be so high that a mixture of 0.9 ml. thereof with 0.1 ml. of 0.9% aqueous sodium chloride failed to flow through the viscometer.

The relative viscosities observed are reported in the following table. The figures reported were obtained from the formula $n/n_0 - 1$ in which $n$ is the number of seconds for the treated sputum sample to flow through the viscometer and $n_0$ is the time for water to pass through the viscometer tube. The results confirm the activity of L-2-acetamido-3-mercaptopropionamide against mucus, and furthermore illustrate its increased potency relative to N-acetyl-L-cysteine.

TABLE 4.—LIQUEFACTION OF HUMAN SPUTA

| Test Solution [1] | Specimen I | | Specimen II | | |
|---|---|---|---|---|---|
| | 30 min. | 60 min. | 15 min. | 30 min. | 60 min. |
| 0.15% N-acetyl-L-cysteine | 95 | 32 | 81 | 25 | 9 |
| 0.15% N-acetyl-L-cysteine + 0.09% sodium chloride | 116 | 36 | | | |
| 0.15% L-2-acetamido-3-mercaptopropionamide | 9 | 4 | 46 | 15 | 7 |
| 0.15% L-2-acetamido-3-mercaptopropionamide plus 0.09% sodium chloride | 15 | 4 | 41 | 10 | 6 |

[1] 0.1 ml. of test soution (pH 7.0) added to 0.9 ml. of homogenized sputum (pH 7.4); reaction temperature, 37° C.; concentrations listed are final concentrations.

EXAMPLE 10

*Vaginal tablet.*—An effervescent vaginal insert tablet having the following composition per tablet is prepared from the following ingredients:

| | | |
|---|---|---|
| L-2-acetamido-3-mercaptopropionamide | mg | 100.0 |
| Cetylpyridinium chloride | mg | 4.0 |
| Tyrothricin | mg | 5.0 |
| Sodium bicarbonate | mg | 50.0 |
| Sodium ethylenediaminetetraacetic acid | mg | 1.0 |
| Lactose powder, q.s. | g | 1.0 |

EXAMPLE 11

*Solution for inhalation.*—An aqueous solution for use in the treatment of respiratory congestion by inhalation has the following composition:

| | | |
|---|---|---|
| L-2-acetamido-3-mercaptopropionamide | g | 5.0 |
| Sodium ethylenediaminetetraacetic acid | g | 0.1 |
| Distilled water, q.s. | ml | 100 |

This solution is adjusted to pH 7 with sodium hydroxide and is administered by nebulization into a face mask, mouth piece, or tent in dosages of 3–5 ml.

EXAMPLE 12

*Sputum examination.*—A composition for the laboratory examination of sputa is prepared from the following ingredients:

| | | |
|---|---|---|
| Aqueous sodium hydroxide, 4% | ml | 25 |
| 0.1 M trisodium citrate | ml | 25 |
| L-2-acetamido-3-mercaptopropionamide | g | 0.25 |

Approximately 10 ml. of the sputum sample is mixed with an equal volume of this reagent and is kept for 15 min. at room temperature. The mixture is then diluted with 2 to 3 volumes of distilled water, and the contents mixed and centrifuged for 15 min. The supernatant fluid is decanted and the remaining sediment is examined microscopically after staining or is used to inoculate nutrient culture media for the morphological identification of viable organisms. This method is particularly useful for the examination of tuberculous sputa.

EXAMPLE 13

*Nasal use.*—A composition suitable for use in the nose is prepared from the following ingredients. This composition is adaptable for instillation into the nose as drops or as a spray from an atomizer or a nitrosol container:

| | | |
|---|---|---|
| L-2-acetamido-3-mercaptopropionamide | g | 10.0 |
| Sodium ethylenediaminetetraacetic acid | g | 0.1 |
| Cetylpyridinium chloride | g | 0.02 |
| Distilled water, q.s. | ml | 100.0 |
| Sodium acid phosphate | g | 0.5 |
| Aqueous sodium hydroxide or phosphoric acid, q.s. | pH | 6.5 |

EXAMPLE 14

(a) *L-2-formamido-3-diphenylmethylthio-N-cyclopentylpropionamide.*—The procedure of Example 2 is applied to L-2-formamido-3-diphenylmethylthiopropionic acid as starting material, resulting in formation of the desired intermediate.

(b) *L-2-formamido-3-mercapto-N-cyclopentylpropionamide.*—A mixture of 0.015 mole of the propionamide intermediate described in Example 14(a), 2 g. of phenol, and 50 ml. of trifluoroacetic acid is heated at the reflux temperature for 20 min. The bulk of the solvent is then distilled from the reaction mixture and the resulting thick slurry is mixed with water and ether. The desired product is collected on a filter and washed with the same solvent mixture. It is purified by recrystallization.

EXAMPLES 15–21

The following amines are substituted in the procedure of Example 14 for preparation of the indicated products:

| Ex. No. | Amine | Product |
|---|---|---|
| 15 | Piperidine | N-(L-2-formamido-3-mercaptopropionyl)piperidine. |
| 16 | Pyrrolidine | N-(L-2-formamido-3-mercaptopropionyl)pyrrolidine. |
| 17 | N-methylpiperazine | 1-(L-2-formamido-3-mercaptopropionyl)-4-methylpiperazine. |
| 18 | Morpholine | N-(L-2-formamido-3-mercaptopropionyl)morpholine. |
| 19 | Thiamorpholine | N-(L-2-formamido-3-mercaptopropionyl)thiamorpholine. |
| 20 | Hexamethylenimine | N-(L-2-formamido-3-mercaptopropionyl)hexamethylenimine. |
| 21 | Cyclopropylamine | L-2-formamido-3-mercapto-N-cyclopropylpropionamide. |

While several particular embodiments of this invention are shown above, it will be understood that the invention is not to be limited thereto, since many modifications may be made, and it is contemplated, therefore, by the appended claims to cover any such modifications as fall within the true spirit and scope of this invention.

What is claimed is:

1. A compound having the formula $$\text{HS}-\underset{R^2}{\overset{R^1}{\text{C}}}-\text{CHCON}\underset{R^3\text{CONH}}{\overset{R^4}{\diagdown}}{R^5}$$

wherein $R^1$ and $R^2$ are hydrogen or alkyl of up to 4 carbon atoms;

R³ is hydrogen, alkyl, aralkyl, or aryl, each of up to 9 carbon atoms;

is piperidino, pyrrolidino, N′-R⁵-piperazino, morpholino, thiamorpholino, hexamethylenimino, or amino wherein R⁴ is hydrogen, alkyl, alkenyl, cycloalkyl, or cycloalkenyl each of up to 5 carbon atoms and is unsubstituted or substituted by up to 2 hydroxyl groups;

R⁵ is hydrogen or lower alkyl of up to 4 carbon atoms and is unsubstituted or substituted by up to 2 hydroxyl groups.

2. 2-acetamido-3-mercaptopropionamide.
3. 2-acetamido-3-mercapto-N-methylpropionamide.
4. 2-propionamido-3-mercaptopropionamide.
5. The mucolytic process which comprises contacting mucus with an effective mucolytic amount of the sulfhydryl compound of claim 1.
6. The process of claim 5 wherein said sulfhydryl compound is 2-acetamido-3-mercaptopropionamide.
7. The process of claim 5 wherein said sulfhydryl compound is 2-acetamido-3-mercapto-N-methylpropionamide.
8. The process of claim 5 wherein said sulfhydryl compound is 2-propionamido-3-mercaptopropionamide.

References Cited

UNITED STATES PATENTS 3,252,866   5/1966   Sheffner _____ 167—87.1

ALBERT T. MEYERS, *Primary Examiner.*

SAM ROSEN, *Examiner.*

S. SINGER, *Assistant Examiner.*